(12) United States Patent  
Austerlitz et al.

(10) Patent No.: US 11,988,539 B2  
(45) Date of Patent: May 21, 2024

(54) AIRCRAFT FLUID GAUGING TECHNIQUES USING PRESSURE MEASUREMENTS AND OPTICAL SENSORS

(71) Applicant: Parker-Hannifin Corporation, Cleveland, OH (US)

(72) Inventors: Howard P Austerlitz, Stony Brook, NY (US); Ronald W Bueter, Cary, NC (US); Stanley Wood, Middle Island, NY (US); Lewis J Boyd, Bath (GB)

(73) Assignee: Parker-Hannifin Corporation, Cleveland, OH (US)

( * ) Notice: Subject to any disclaimer, the term of this patent is extended or adjusted under 35 U.S.C. 154(b) by 1795 days.

(21) Appl. No.: 14/510,288

(22) Filed: Oct. 9, 2014

(65) Prior Publication Data

US 2015/0100253 A1    Apr. 9, 2015

Related U.S. Application Data

(60) Provisional application No. 61/888,572, filed on Oct. 9, 2013.

(51) Int. Cl.
*G01F 23/14* (2006.01)
*G01F 22/00* (2006.01)
*G01F 23/18* (2006.01)

(52) U.S. Cl.
CPC .............. *G01F 23/14* (2013.01); *G01F 22/00* (2013.01); *G01F 23/18* (2013.01)

(58) Field of Classification Search
CPC .......... G01F 22/00; G01F 23/18; G01F 23/14; G01F 23/20; G01F 23/22; G01F 23/292; G01L 11/02

(Continued)

(56) References Cited

U.S. PATENT DOCUMENTS

| | | | |
|---|---|---|---|
| 4,553,216 A | | 11/1985 | Stevens et al. |
| 5,138,559 A | * | 8/1992 | Kuehl ..................... G01F 23/14 |
| | | | 340/618 |

(Continued)

FOREIGN PATENT DOCUMENTS

| | | |
|---|---|---|
| EP | 0 441 050 | 12/1990 |
| GB | 2 252 405 | 8/1992 |

(Continued)

OTHER PUBLICATIONS

Yu et al., An Airplane Fuel Management System by Using Optic Fiber Sensors, Apr. 12, 2012 (Online), Advanced Materials Research, vols. 503-504, pp. 1306-1309.*

(Continued)

*Primary Examiner* — Toan M Le
(74) *Attorney, Agent, or Firm* — Renner, Otto, Boisselle & Sklar, LLP

(57) ABSTRACT

A fluid level measurement system includes a first pressure sensor disposed inside a fluid tank at a first elevation relative to a height axis of the fluid tank, and a second pressure sensor disposed inside the fluid tank at a second elevation relative to the height axis of the fluid tank, the second elevation different from the first elevation. The first pressure sensor and the second pressure sensor are configured to provide a signal indicative of a sensed pressure, and fluid height is calculated from the difference in sensed pressure between the first and second pressure sensors relative to the sensed pressure of either the first or the second pressure sensor.

19 Claims, 10 Drawing Sheets

(58) Field of Classification Search
USPC ............. 702/50, 55, 138, 140, 156; 73/299, 73/290 R, 301, 861.49, 292; 340/618
See application file for complete search history.

(56) References Cited

U.S. PATENT DOCUMENTS

| | | | |
|---|---|---|---|
| 6,157,894 A * | 12/2000 | Hess | B64D 37/00 702/141 |
| 6,434,494 B1 | 8/2002 | Forsythe, Jr. et al. | |
| 6,473,712 B1 * | 10/2002 | Faye | B60T 8/172 701/94 |
| 6,606,905 B2 | 8/2003 | Carroll et al. | |
| 6,698,692 B1 * | 3/2004 | Tichenor | B64D 37/24 244/135 R |
| 7,251,998 B2 * | 8/2007 | Gourlay | G01F 23/14 73/290 R |
| 2002/0041724 A1 * | 4/2002 | Ronnekleiv | A61B 5/01 385/12 |
| 2004/0016457 A1 * | 1/2004 | Bolland | G01F 23/185 137/391 |
| 2004/0163727 A1 * | 8/2004 | Nanaji | B67D 7/0478 141/82 |
| 2009/0314783 A1 * | 12/2009 | Losinski | B64D 37/08 220/530 |
| 2010/0018703 A1 * | 1/2010 | Lovell | E21B 47/123 166/255.2 |
| 2010/0245840 A1 * | 9/2010 | Vernooy | G01L 9/0079 356/519 |

FOREIGN PATENT DOCUMENTS

| | | |
|---|---|---|
| GB | 2 425 830 | 11/2006 |
| WO | 99/32857 | 7/1999 |
| WO | 2006/054117 | 5/2006 |
| WO | 2006/122282 | 11/2006 |

OTHER PUBLICATIONS

Lai et al Application of Fiber Bragg Grating Level Sensor and Fabry-Perot Pressure Sensor to Simultaneous Measurement of Liquid Level and Specific Gravity, Apr. 2012, IEEE Sensors Journal, vol. 12, No. 4, pp. 827-831.*

* cited by examiner

AIRCRAFT FLUID GAUGING TECHNIQUES USING PRESSURE MEASUREMENTS AND OPTICAL SENSORS

RELATED APPLICATION DATA

This application claims the priority of U.S. Provisional Application No. 61/888,572, filed on Oct. 9, 2013, which is hereby incorporated in its entirety by reference.

TECHNICAL FIELD

The present application relates generally to fluid gauging and, more particularly, to a system, apparatus and method for using pressure measurements to gauge fluid levels in a fluid tank.

BACKGROUND ART

The majority of aircraft fluid level gauging systems such as, for example, fuel tank level gauging systems, rely upon capacitance-based probes as their primary sensors. In order to provide adequate system accuracy (usually expressed as the total mass of fuel in a tank), many of these probes are required, resulting in a significant system weight (e.g., due to the probes themselves and their associated electrical wiring). In addition, capacitive probes are sensitive to electrically conductive contaminants in the fuel (including water) and the large number of in-tank electrical wires presents an intrinsic safety hazard, requiring complex protection mechanisms.

An alternate approach to capacitive-based probes is to use pressure sensors to determine the fuel level in an aircraft fuel tank. A system based on pressure gauging potentially requires fewer sensors in a tank, minimizing weight (both from smaller sensors and less wiring). Pressure sensors are also insensitive to electrically-conductive contaminants in the fuel, and do not have the same height measurement limits as capacitive probes. Further, use of optical pressure sensors can reduce or eliminate electrically conductive materials in the tank and therefore are safer than non-optical systems.

In the past, commercially available pressure sensors did not have the required resolution and accuracy over the required full-scale range of pressure (down to a few thousandths of a PSI or a few milliPSI over a full-scale range of tens of PSI) needed for reasonable system accuracy. Newer classes of pressure sensors are now available that can meet these requirements, making such a system practical. In addition, optical-based pressure sensors are being developed that can also meet the accuracy requirements and additionally act as inherently intrinsically safe sensors (since no electrical wiring is needed inside of a fuel tank).

SUMMARY OF INVENTION

A system, apparatus and method in accordance with the present invention enable a fluid level within a fluid tank to be determined based on a pressure differential between two measured pressures within the tank.

According to one aspect of the invention, two or more pressure sensors vertically spaced apart from each other by a known distance each provide respective pressure measurements. The fluid level in the tank is calculated based on a difference in measured pressure.

According to another aspect of the invention, three or more pressure sensors spaced apart from one another by a known distance provide respective pressure measurements. A location of a fluid surface plane within the tank is determined based on the pressure measurements from the three or more pressure sensors in combination with the known spacing between sensors.

According to one aspect of the invention, a fluid level measurement system includes: a first pressure sensor disposed inside a fluid tank at a first elevation relative to a height axis of the fluid tank; a second pressure sensor disposed inside the fluid tank at a second elevation relative to the height axis of the fluid tank, the second elevation different from the first elevation, wherein the first pressure sensor and the second pressure sensor are configured to provide a signal indicative of a sensed pressure, and fluid height is calculated from the difference in sensed pressure between the first and second pressure sensors.

According to one aspect of the invention, fluid height is calculated from the difference in sensed pressure between the first and second pressure sensors relative to the sensed pressure of either the first or the second pressure sensor.

According to one aspect of the invention, the system includes a controller communicatively coupled to the first pressure sensor and the second pressure sensor to receive the signal indicative of the sensed pressure from each sensor, the controller configured to calculate the fluid level in the fluid tank based on the difference in sensed pressures of the first and second pressure sensors.

According to one aspect of the invention, the system further includes the fluid tank.

According to one aspect of the invention, the first pressure sensor is spaced a first known distance apart from the second pressure sensor along an axis parallel to the height axis.

According to one aspect of the invention, the system includes a third pressure sensor disposed inside the fluid tank and at a third elevation relative to a height axis of the fluid tank, the third pressure sensor spaced a second known distance apart from the first pressure sensor and a third known distance from the second pressure sensor, wherein the controller is configured to calculate a location of a fluid surface plane in the fluid tank based on the sensed pressure of the first, second and third pressure sensors and the first known distance, the second known distance, and the third known distance.

According to one aspect of the invention, the controller is configured to calculate at least one of a pitch angle of a fluid surface or a roll angle of the fluid surface relative to a reference surface of the fluid tank based on the first known distance, the second known distance, and the third known distance.

According to one aspect of the invention, the first pressure sensor and the second pressure sensor are arranged on a common support member of an integrated pressure assembly.

According to one aspect of the invention, at least one of the first pressure sensor or the second pressure sensor comprises an optical pressure sensor.

According to one aspect of the invention, the controller is optically coupled to at least one of the first pressure sensor or the second pressure sensor.

According to one aspect of the invention, at least one of the first pressure sensor or the second pressure sensor comprises a passive optical pressure sensor.

According to one aspect of the invention, at least one of the first pressure sensor or the second pressure sensor comprises at least one of a passive Fabry-Perot optical pressure sensor or a passive Fiber Bragg Grating optical pressure sensor.

According to one aspect of the invention, at least one of the first pressure sensor or the second pressure sensor comprises a differential pressure sensor having a first port fluidically connected to an ullage portion of the fluid tank.

According to one aspect of the invention the system includes a gas-filled equalizer arranged within the fluid tank and fluidically connected to an ullage portion of the fluid tank, wherein the first port of each differential pressure sensor is fluidically connected to the gas-filled equalizer.

According to one aspect of the invention, the gas-filled equalizer comprises an outer surface and a portion of the outer surface includes a flexible membrane, further comprising a fourth pressure sensor disposed inside the tank, wherein the fourth pressure sensor is a differential pressure sensor having a first port fluidically connected to the ullage portion of the fluid tank and a second port fluidically connected to the gas-filled equalizer.

According to one aspect of the invention, an aircraft includes the fluid level measurement system described herein.

According to one aspect of the invention, a method of measuring a fluid level in a fluid tank is provided, the fluid tank including a first pressure sensor disposed inside the fluid tank at a first elevation relative to a height axis of the fluid tank and a second pressure sensor disposed inside the fluid tank at a second elevation relative to the height axis of the fluid tank, the second elevation different from the first elevation. The method includes: using the first pressure sensor to measure a first pressure value; using the second pressure sensor to measure a second pressure value; and calculating the fluid level of the fluid in the tank based on a difference in pressure between the first measured pressure value and the second measured pressure value.

According to one aspect of the invention, calculating the fluid leveled comprises calculating the fluid level from the difference in sensed pressure between the first and second pressure sensors relative to the sensed pressure of either the first or the second pressure sensor.

According to one aspect of the invention, calculating the fluid level includes using the equation $$Z_n = \frac{\Delta Z}{P_2 - P_1} \times P_n,$$

where $Z_n$ is the fluid level, $P_2$ is the second measured pressure value, $P_1$ is the first measured pressure value, $\Delta Z$ is the difference between second elevation and the first elevation, and $P_n$ is the pressure reading of an nth pressure sensor.

According to one aspect of the invention, using the first and second pressure sensors includes using first and second differential pressure sensors, respectively, to measure the first and second pressure values.

According to one aspect of the invention, the method includes coupling the first and second pressure sensors to a pressure equalizer, the pressure equalizer fluidically coupled to an ullage of the fluid tank.

According to one aspect of the invention, the fluid tank includes a first pressure sensor disposed inside the fluid tank, a second pressure sensor disposed inside the fluid tank and horizontally spaced apart from the first pressure sensor by a first known distance, and a third pressure sensor disposed inside the fluid tank and horizontally spaced apart from the first pressure sensor by a second known distance and horizontally spaced apart from the second pressure sensor by a third known distance. The method further includes: determining a first fluid level height based on a first pressure value obtained from the first pressure sensor; determining a second fluid level height based on a second pressure value obtained from the second pressure sensor; determining a third fluid level height based on a third pressure value obtained from the third; and calculating a location of a fluid surface plane in the fluid tank based on the first, second and third fluid levels.

According to one aspect of the invention, the method further includes calculating a pitch angle of the fluid surface relative to a reference surface of the fluid tank based on the first known distance, second known distance, and third known distance.

According to one aspect of the invention, the method includes calculating a roll angle of the fluid surface relative to a reference surface of the fluid tank based on the first known distance, second known distance, and third known distance.

According to one aspect of the invention, the method includes calculating a volume of fluid in the fluid tank based on a known geometry of the fluid tank, the fluid surface plane, the pitch angle, and the roll angle.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

The present invention will be described in the context of a fuel tank of a vehicle, such as an aircraft. However, such description is intended to be exemplary, and those having ordinary skill in the art will appreciate that aspects of the present invention may be applied to fuel tanks for other vehicles and/or to other containers that store a fluid.

As used herein, the term "height axis" refers to an axis that is generally parallel with an axis defined by dominant gravitational forces exerted on the fluid tank and perpendicular to a fluid surface. For example, a tank may have a first "fixed" axis, which may be referred to as a tank vertical axis (e.g., Z in FIG. 2), while a location of the height axis (e.g., h in FIG. 1a) may move relative to the tank vertical axis depending on the orientation of the tank.

The mass of fuel in a tank can be determined from the fuel volume (V) and the fuel density ($\rho$). For example, the fuel mass, m, can be determined using Equation 1.

$$m = V \times \rho \qquad \text{Equation 1}$$

The density of the fuel may be known or measured using conventional techniques, e.g., via a densitometer. In order to determine the volume V of the fuel, a top fuel surface (height and angle) of the fuel in the tank may be determined using, for example, known dimensions of the tank in combination with pressure measurements in the tank (preferably three pressure sensors are used to determine the volume of the fuel in the tank). For example, basic vertical height measurement parallel to the acceleration vector (h) of a static column of fluid can be defined by Equation 2, where P is the pressure as measured by the pressure sensor, $\rho$ is the fluid density (known or measured) and g is gravitational acceleration (known or measured).

$$h = \frac{P}{\rho \times g} \qquad \text{Equation 2}$$

Therefore, if the density of a fluid and the local gravitational acceleration are known or can be determined, the fluid height can be calculated from a pressure measurement.

Figure 1A:
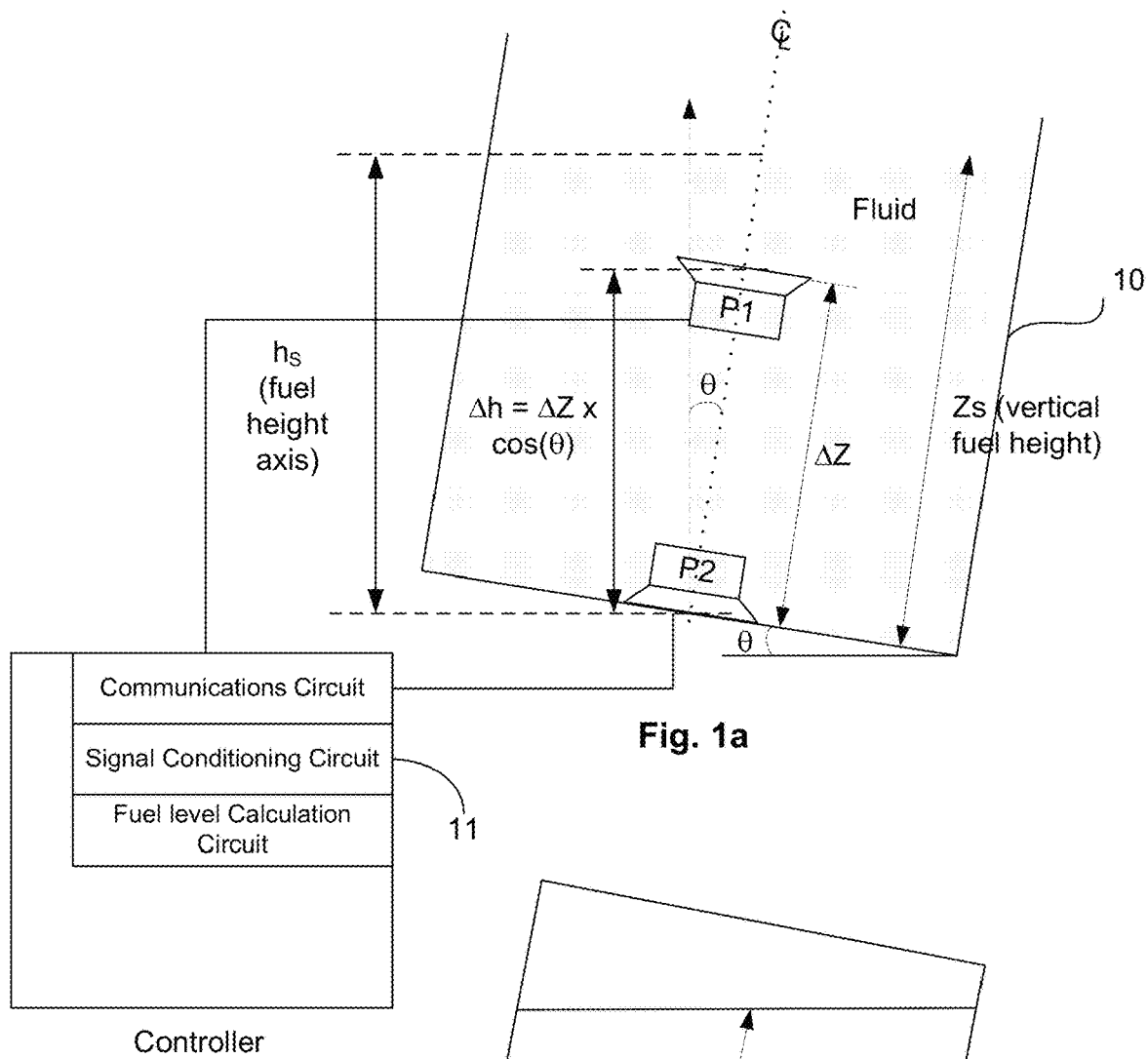
FIG. 1a is a schematic diagram illustrating dual pressure sensors arranged in a tank tilted at an angle in accordance with an embodiment of the present invention.

In the first example, the vertical height measurement (h) is equal to the surface height in the fixed axis (Z). However, if the column of fluid being measured by a pressure sensor is tilted at an unknown angle, the determination of its Z height becomes much more difficult. In accordance with an embodiment of the present invention, two pressure sensors having a precisely known vertical spacing ($\Delta Z$) between one another are used, as shown in FIG. 1a. The vertical spacing $\Delta Z$ refers to a difference in elevation between the pressure sensors when the tank has a level orientation. For example, if the tank has a flat bottom surface, then the vertical spacing $\Delta Z$ is the difference in elevation between the respective pressure sensors when the flat bottom surface of the tank is level.

In FIG. 1a, first and second pressure sensors, P1 and P2, are arranged in a tank 10 and vertically spaced apart by a distance of $\Delta Z$. A controller 11 is communicatively coupled to the respective pressure sensors P1 and P2 and receives pressure data from each respective sensor. The controller 11 may be located at or near the sensors, or it may be located remote from the sensors. The controller 11 can be integral with another system, e.g., the controller can be part of an aircraft's fuel gauging system, or it may be a standalone unit that interfaces with other systems.

With continued reference to FIG. 1a, if the tank 10 (and sensor pair) is tilted at an angle $\theta$, the effective vertical separation $\Delta h$ between the first pressure sensor P1 and the second pressure sensor P2 can be defined by Equation 3

$$\Delta h = \Delta Z \times \cos(\theta) \qquad \text{Equation 3}$$

Further, the pressure difference $P_2-P_1$ varies with tilt angle $\theta$ as shown in Equation 4.

$$P_2 - P_1 = \rho \times g \times \Delta Z \times \cos(\theta) \qquad \text{Equation 4}$$

Equation 4 can be rewritten as shown in Equation 5, and since the vertical fluid height is given by Equation 6, the relationship shown in Equation 7 results.

$$\frac{P_2 - P_1}{\Delta Z} = \rho \times g \times \cos(\theta) \qquad \text{Equation 5}$$

$$Z_s = \frac{P_2}{\rho \times g \times \cos(\theta)} = \frac{P_2}{\frac{P_2 - P_1}{\Delta Z}} \qquad \text{Equation 6}$$

$$Z_S = \frac{\Delta Z}{P_2 - P_1} \times P_2 \qquad \text{Equation 7}$$

Accordingly, by measuring the pressure difference between two pressure sensors P1 and P2 at a known vertical spacing ($\Delta Z$), the tilt angle of the fuel tank 10 can be determined and taken into account without the need to measure that angle. Then, using Equation 7, the vertical height of fuel $Z_S$ above the lower sensor P2 can be determined. In addition, if there are other pressure sensors located at the bottom of the same fuel tank 10 (and thus tilted at the same angle), the same scale factor of $$\frac{\Delta Z}{P_2 - P_1}$$

can be used to convert the pressure reading to vertical fuel height. So, for sensor $P_n$, the vertical fuel height would be defined by Equation 8.

$$Z_n = \frac{\Delta Z}{P_2 - P_1} \times P_n \qquad \text{Equation 8}$$

The above approach also works for compound angles, when the tank 10 is tilted in two axes (as with the pitch and roll angle in an aircraft fuel tank).

The accuracy of the fluid level measurement using multiple pressure sensors is dependent on knowing the precise vertical spacing between the pressure sensors (e.g., the vertical spacing between P1 and P2). Therefore, the positioning of the pressure sensors P1 and P2 during installation in the tank 10 can have significant influence on the accuracy of the overall system. The skill of the installer, the precision of the tools used to determine the vertical spacing, etc. all contribute to the overall accuracy of the system.

Figure 1B:
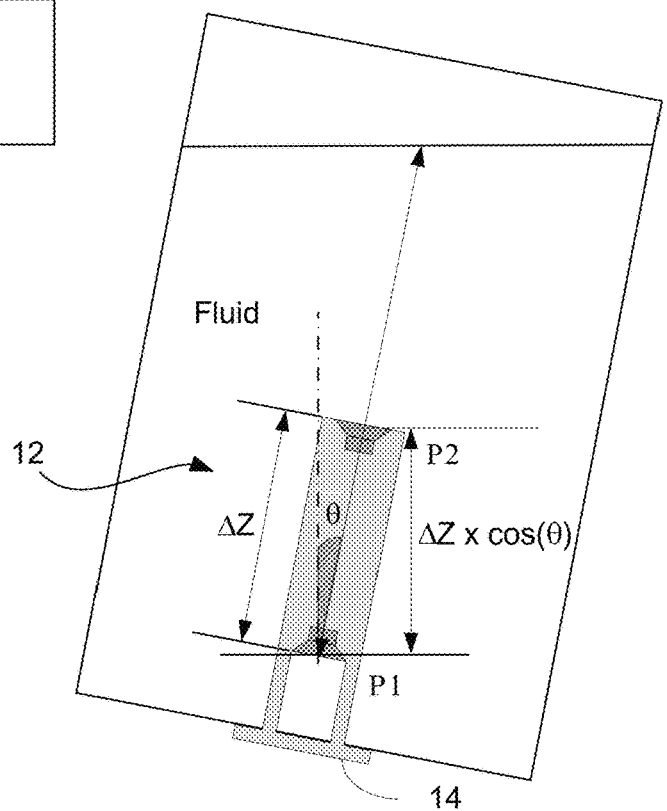
FIG. 1b illustrates integrated dual pressure sensors in the tank of FIG. 1a in accordance with an embodiment of the present invention.

To eliminate possible errors due to installation issues, an integrated pressure sensor assembly 12 having two pressure sensors P1 and P2 can be used, as shown in FIG. 1b. The integrated pressure sensor assembly 12 includes a support member 14 for mounting both the first pressure sensor P1 and the second pressure sensor P2 thereon. The tank 10 and support member 14 may be configured for easy insertion of the pressure sensor assembly 12 into and removal from the tank 12 (e.g., the pressure sensor assembly 12 may be configured as a cartridge that can be inserted into a corresponding receptacle in the tank 10). Once inserted into the tank 10, a fluid-tight seal is formed between a portion of the support 14 and the tank 10.

Since the pressure sensors P1 and P2 are mounted on the support 14 during the manufacturing phase of the pressure sensor assembly 12 and not during installation in the tank 10, there is much more control over the spacing between the sensors P1 and P2. As a result, system accuracy is enhanced while installation time is minimized.

Figure 2:
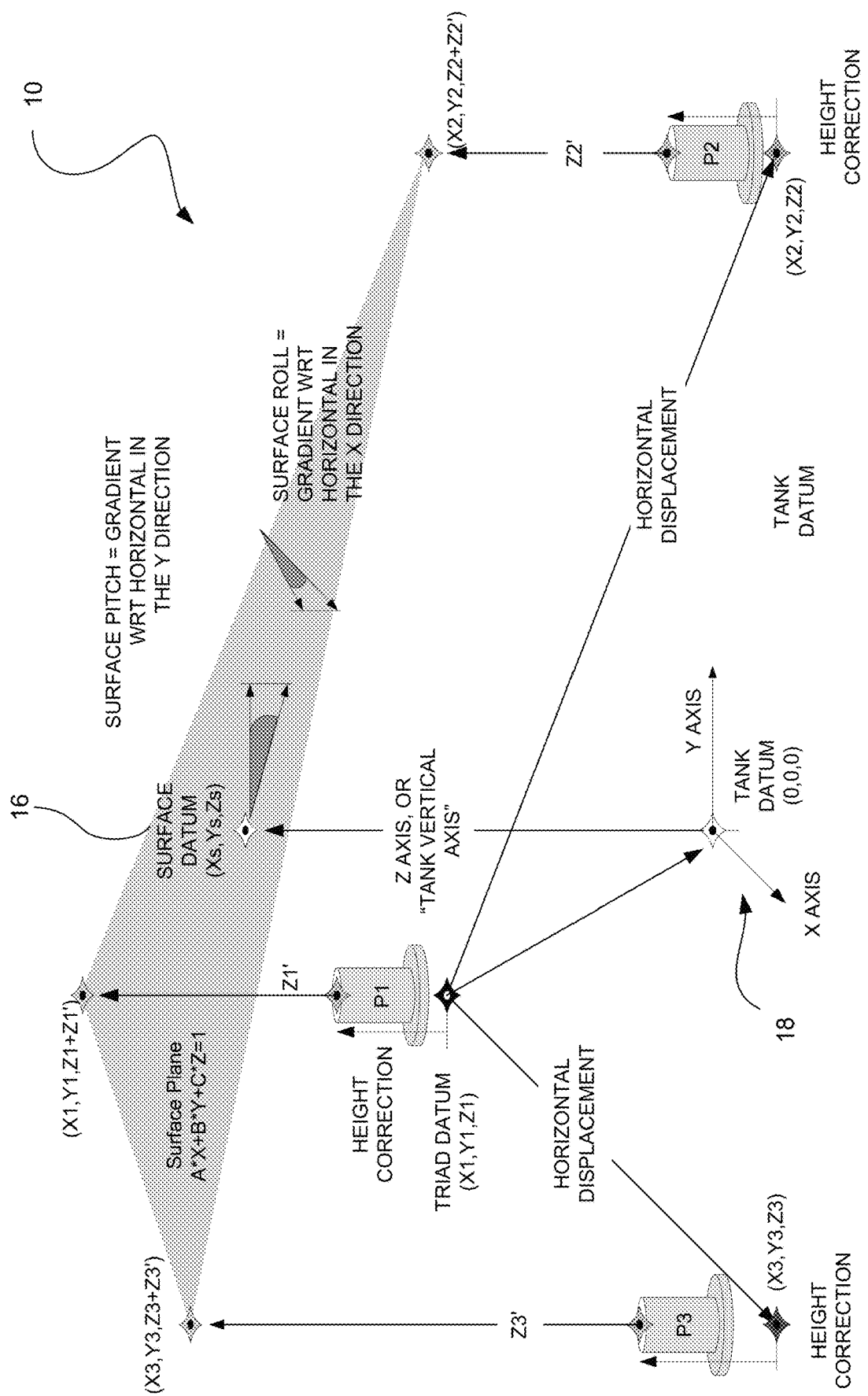
FIG. 2 is a schematic diagram illustrating the determination of a fluid surface plane using three pressure sensors in accordance with an embodiment of the invention.

Assuming the dimensions of a rectangular fuel tank 10 are known in advance, the volume of fuel in that tank 10 can be determined if the plane defining the surface of the fluid is known. This fluid surface plane 16 can be calculated from the height measurements of three separated pressure sensors P1, P2 and P3 in the tank 10, as shown in FIG. 2, based upon Equation 9 (the standard surface plane equation), where A, B and C are coefficients for any given plane, and X, Y and Z are orthogonal axes (assuming a standard Cartesian coordinate system).

$$A \times X + B \times Y + C \times Z = 1 \quad \text{Equation 9}$$

It is noted that while reference is made to a rectangular tank, the techniques described herein can be applied to tanks having more complex shapes.

In order to perform the fluid surface plane calculations, a reference point 18 for the coordinate system is selected in the tank 10 (the Tank Datum in FIG. 2), typically the bottom, center of the tank 10. The position of the sensing elements in each of the three pressure sensors P1, P2 and P3 is then determined using this coordinate system.

Using the method previously described, the fluid height Z1', Z2' and Z3' above each of the three pressure sensors P1, P2 and P3, respectively, is determined. Knowing the coordinates of the three pressure sensors at the bottom of the tank, (X1,Y1,Z1), (X2,Y2,Z2) and (X3,Y3,Z3) relative to at the origin (0,0,0), three points on the fluid surface plane 16 can be defined: (X1,Y1,Z1+Z1'), (X2,Y2,Z2+Z2'), (X3,Y3,Z3+Z3').

Using these X,Y,Z coordinates, the tilt of the surface plane 16 can be calculated relative to a reference surface of the fuel tank (e.g., the bottom surface) using Equations 10 and 11.

$$\text{Pitch Angle} = \operatorname{atan}\left|\frac{\left(\frac{(Z3+Z3')-}{(Z1+Z1')}\right)\times X2 - \left(\frac{(Z2+Z2')-}{(Z1+Z1')}\right)\times X3}{(X2\times Y3)-(Y2\times X3)}\right| \quad \text{Equation 10}$$

$$\text{Roll Angle} = \operatorname{atan}\left|\frac{\left(\frac{(Z2+Z2')-}{(Z1+Z1')}\right)\times Y3 - \left(\frac{(Z3+Z3')-}{(Z1+Z1')}\right)\times Y2}{(X2\times Y3)-(Y2\times X3)}\right| \quad \text{Equation 11}$$

Based on this information, the surface plane is fully defined and the volume of fluid in a known tank can be calculated using the determined plane and the known geometry of the tank.

Other techniques also may be applied. For example, the pressure sensors can be used to derive a "virtual probe height", e.g., a length measurement of how high the fuel surface is related to the sensor location. The heights in combination with pitch and roll can be used along a predefined look-up table to look up the volume.

Briefly referring back to FIG. 1a, the controller 11 can include circuitry that enables a) two-way communications with one or more pressure sensors and/or other external devices (e.g., an aircraft fuel management system), b) conditioning data received from pressure sensors, and/or c) calculating the fluid level and/or fluid plane within the tank based on measured pressures. The circuitry may be in the form of a processor executing software instructions stored in memory of the controller 11. However, the circuitry may be realized with any control circuit configured to carry out the desired functions described herein.

Pressure Sensor Configuration—Absolute vs. Differential

Fluid pressure measurements used for aircraft fuel gauging should be relative to the air pressure above the fluid in the fuel tank 10 (the "ullage space"). If the pressure sensors shown in FIGS. 1a, 1b and 2 were absolute sensors, they would measure the pressure generated by both the fluid ($P_f$) and by the air pressure in the ullage space ($P_u$), as shown in Equation 12

$$P_{sensor} = P_f + P_u \quad \text{Equation 12}$$

Thus, if absolute pressure sensors are used, an additional sensor can be used to measure $P_u$ in order to determine $P_f$, as shown in Equation 13.

$$P_f = P_{sensor} - P_u \quad \text{Equation 13}$$

A drawback to absolute pressure sensors is their high accuracy requirements. For example, in order to measure fuel height to an accuracy of approximately ¼ inch, the accuracy in measuring Pf should be approximately 0.008 psi. This means that the accuracy in both $P_{sensor}$ and $P_u$ measurements should be approximately 0.004 psi. In order for $P_{sensor}$ to measure a full tank height of around 8 feet on the ground (at normal atmospheric pressure), the sensor should have a full scale range of approximately 19 psi. The required 0.004 psi accuracy corresponds to a normalized accuracy of approximately 0.02% of Full Scale. In addition, the sensor should maintain this accuracy over a period of 5-20 years. This is a very difficult accuracy to achieve.

Figure 3:
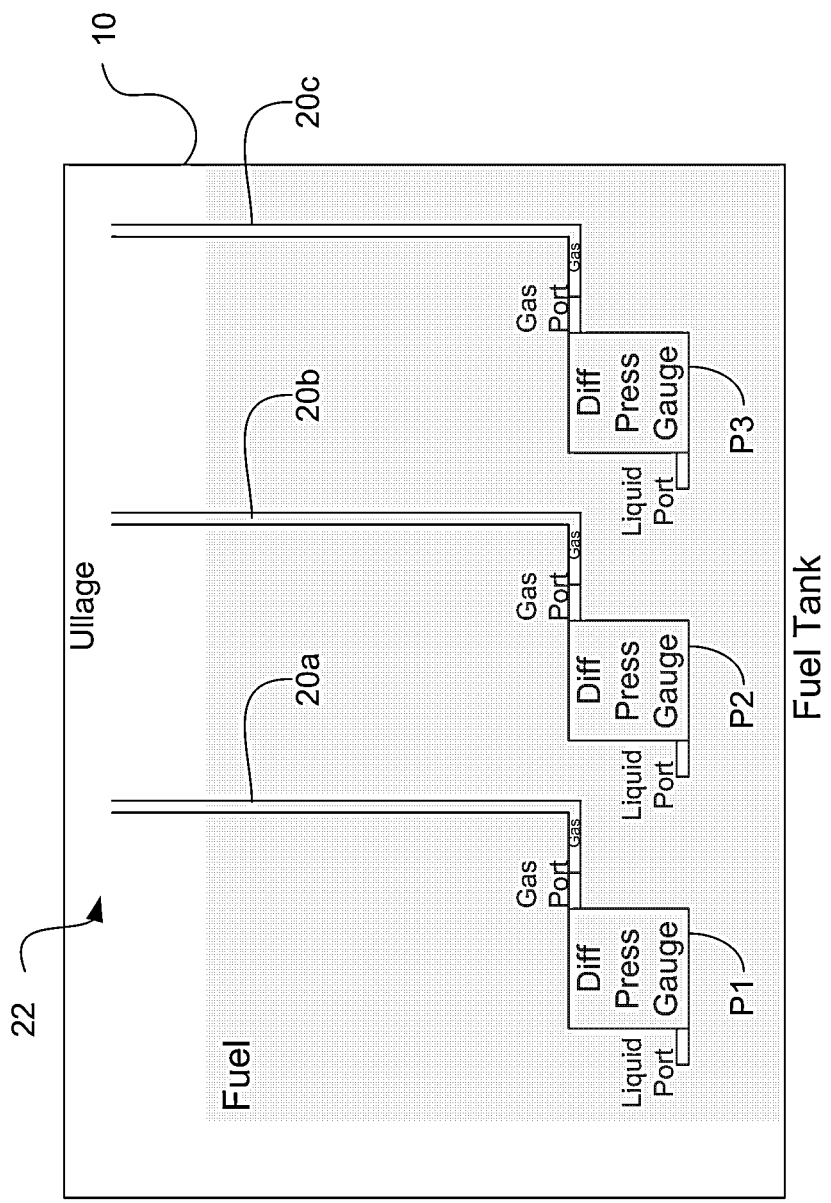
FIG. 3 is a schematic diagram illustrating the configuration of three different differential pressure sensors in a tank in accordance with an embodiment of the invention.

Instead of using an additional sensor, it is preferable to use differential pressure sensors coupled to a tube, where the tube connects directly to the ullage space. In this manner, the pressure sensors will use the ullage space as the reference pressure. FIG. 3 illustrates such configuration, where three pressure sensors P1, P2 and P3 are arranged in a tank 10. Connected to the gas port of each pressure sensor P1, P2 and P3 is a respective tube 20a, 20b, 20c, the tubes coupling each respective gas port to the ullage space 22 and thus referencing any pressure measurement at the sensor liquid port to the ullage pressure Pu.

Using the previous example, a differential pressure sensor would only require a full scale range of just over 4 psi, requiring a normalized accuracy of approximately 0.1%. This is a 5-fold reduction in required accuracy and well within the range of commercially available sensors.

Pressure Equalizer

A drawback of using differential pressure sensors in fluid gauging systems is the relatively large number of tubes needed to connect the differential pressure sensors P1, P2 and P3 at the bottom of the fuel tank 10 to the ullage space 22 at the top of the fuel tank (or any other reference pressure representative of the ullage pressure, such as in a vent or an overflow tank), as shown in FIG. 3.

Figure 4:
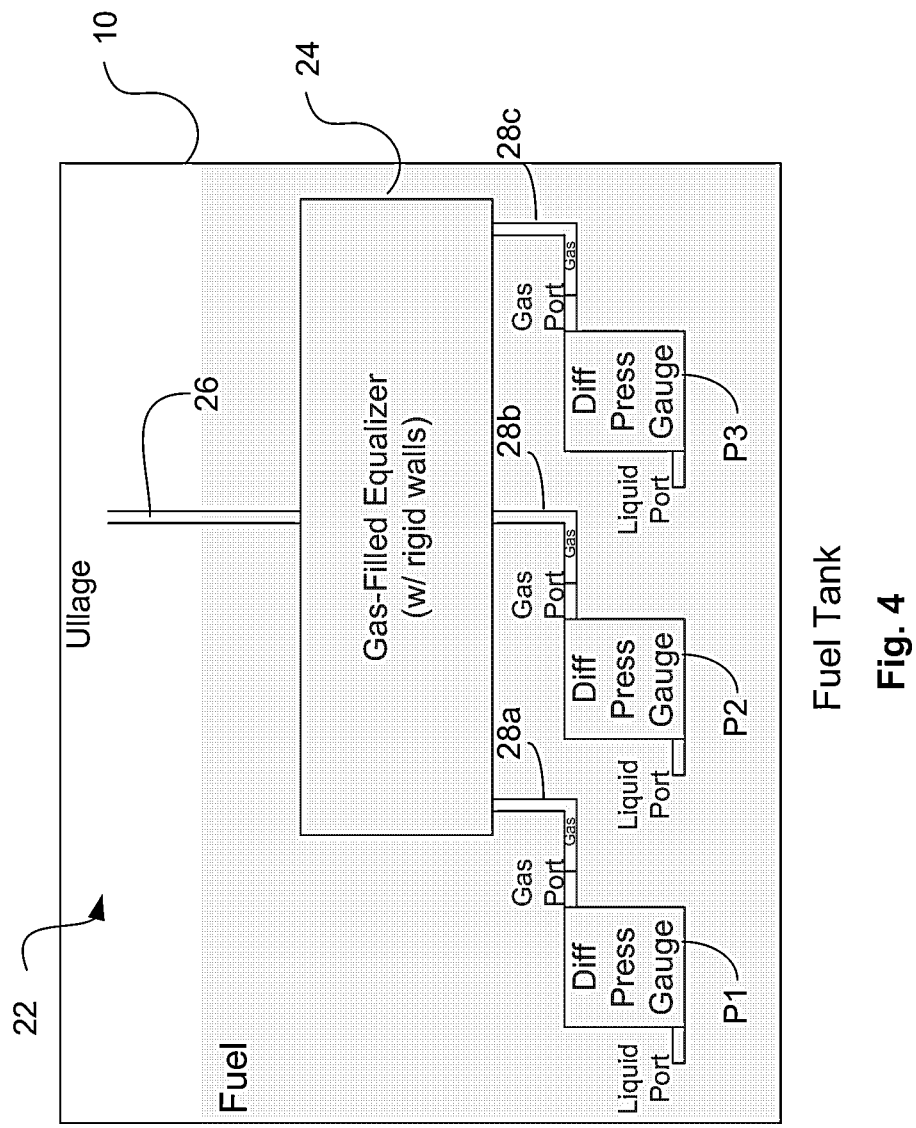
FIG. 4 is a schematic diagram illustrating differential pressure sensors connected to an equalizer with rigid wall in accordance with an embodiment of the invention.

One approach to minimizing the tubing required for differential pressure sensors is to use a gas reservoir, called a pressure equalizer. In FIG. 4, a pressure equalizer 24 has a rigid body and uses a single tube 26 to connect it to the ullage space 22. The pressure sensors P1, P2 and P3 connect to the pressure equalizer 24 via individual tubes 28a, 28b and 28c thereby providing a pressure reference to the gas port of each differential pressure sensor P1, P2 and P3. The pressure equalizer 24 can alternately connect to another location, close in pressure to the ullage space 22, if an additional sensor is used to measure the difference between the ullage space 22 and the equalizer pressure. This may be necessary if there are routing difficulties for the gas tube 26 from the pressure equalizer 24 to the ullage space 22.

Figure 5:
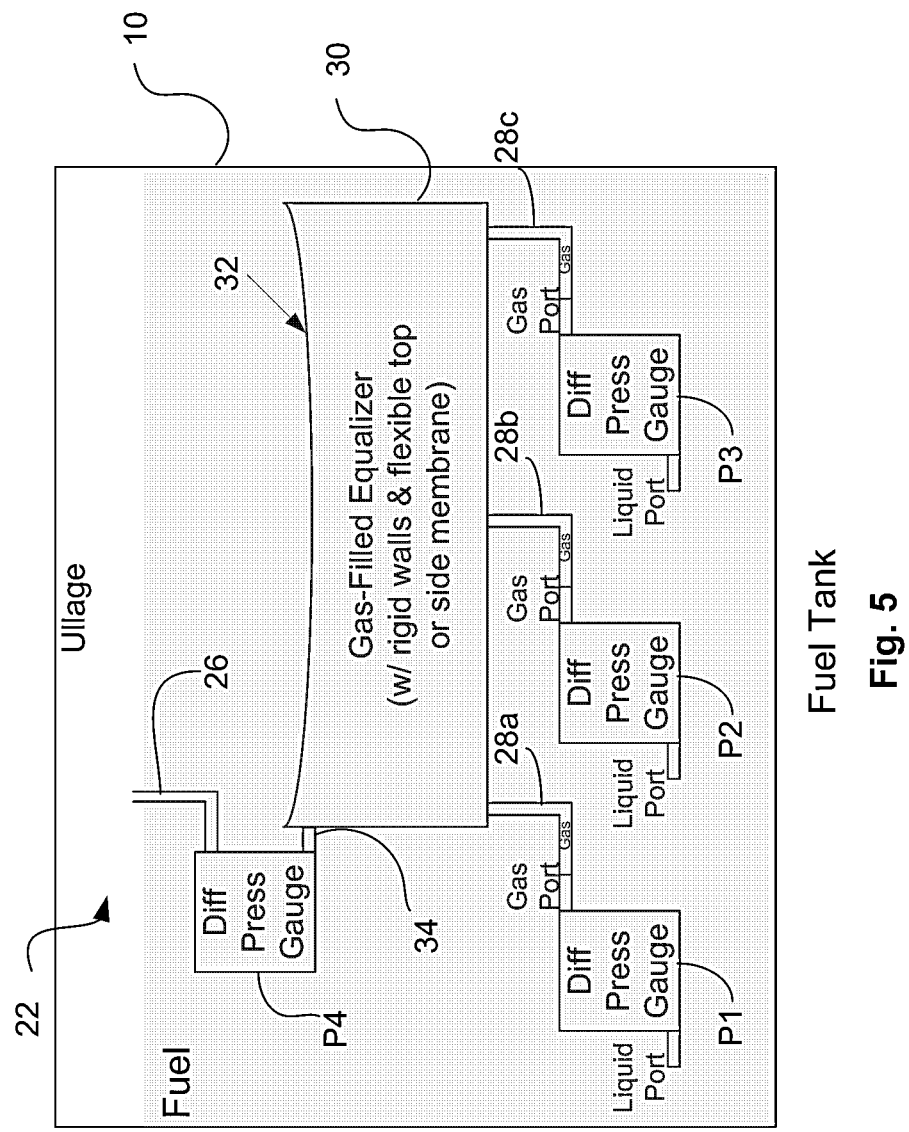
FIG. 5 is a schematic diagram illustrating differential pressure sensors connected to an equalizer with a flexible wall in accordance with an embodiment of the invention.

Another approach that allows for the use of a lower full-scale range for the differential pressure sensors P1, P2 and P3 (and thus a less-stringent full-scale accuracy), is shown in FIG. 5. Here, a pressure equalizer 30 is shown with a flexible membrane 32 on at least one side. The flexible membrane 32 transmits the external pressure in the fluid, at the height of the pressure equalizer 30, to the gas (reference) ports of the differential pressure sensors P1, P2 and P3. For example, if this Equalizer is located at ½ of the maximum tank height (where it is assumed the full tank height results in a pressure of 4 psi), the pressure equalizer 30 would have a nominal pressure of approximately 2 psi less than the bottom of the tank 10. Hence, the differential pressure sensor accuracy could be reduced by a further factor of 2× (to approximately 0.2% FS in the previous examples).

The only drawback with the flexible membrane equalizer is the need for an additional differential pressure sensor to measure the pressure between the ullage space 22 and the equalizer 30. For example, and with reference to FIG. 5, pressure sensor P4 receives an ullage reference signal via tube 26 and an equalizer pressure signal via tube 34. Based on these signals the pressure sensor P4 measures the pressure differential between the ullage space 22 and the equalizer 30. This differential then can be added to the pressure measured by the sensors P1, P2 and P3.

In the configuration shown in FIG. 5, the equalizer pressure will change as fuel height changes. Further, if the equalizer 30 in FIG. 5 becomes uncovered by fuel, it will have the same pressure as the ullage space 22.

Optically Isolated Pressure Sensors

Figure 6:
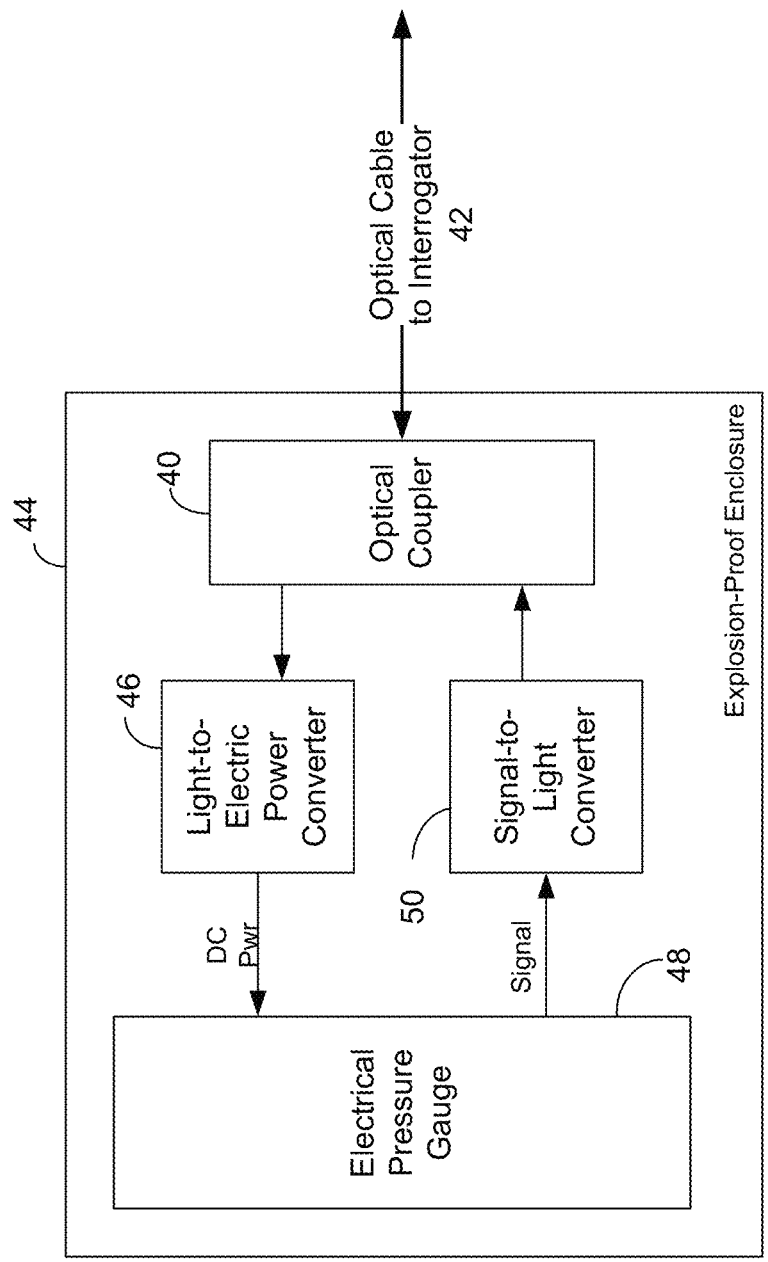
FIG. 6 is a block diagram illustrating an optically-isolated pressure sensor in accordance with an embodiment of the present invention.

Electrical wiring inside of an aircraft's fuel tank presents a potential safety hazard, due to the potential for spark generation, unless significant (and costly) protection techniques are employed. This is particularly significant for newer aircraft using composite (non-metallic) wings and their increased exposure to lightning hazards. One approach to eliminate electrical wiring hazards is to package conventional electrical pressure sensors in small, sealed, explosion-proof enclosures with optical interfaces. In other words, all external connections to the pressure sensors are via optical fiber, which are intrinsically safe. FIG. 6 shows the basic concept of such approach.

For example, an optical coupler 40, which receives optical signals from controller, via an optical cable 42, can be arranged within an explosion-proof enclosure 44. The optical coupler 40 provides optical power to a light-to-electric power converter 46, which converts the optical power into direct current (DC) power. Electrically coupled to the light-to-electric power converter 46 is an electrical pressure sensor 48, which receives the DC power. A sensing element (not shown) of the pressure sensor 48 is in fluid communication with the fuel, and generates a pressure signal based on a pressure exerted by the fuel on the sensing element.

The pressure signal generated by the sensing element is provided to a signal-to-light converter 50, which converts the electrical signal into an optical signal. The optical signal then is provided to the optical coupler 40 and is communicated to the controller via the optical cable 42.

Passive Optical Pressure Sensors

Another approach to eliminate the potential hazards associated with wired pressure sensors is to use an all-optical system topology. This is based upon a passive optical sensor, connected via optical fibers to an electro-optical interrogation unit (that is located outside of the fuel tank), as shown in FIG. 7.

Figure 7:
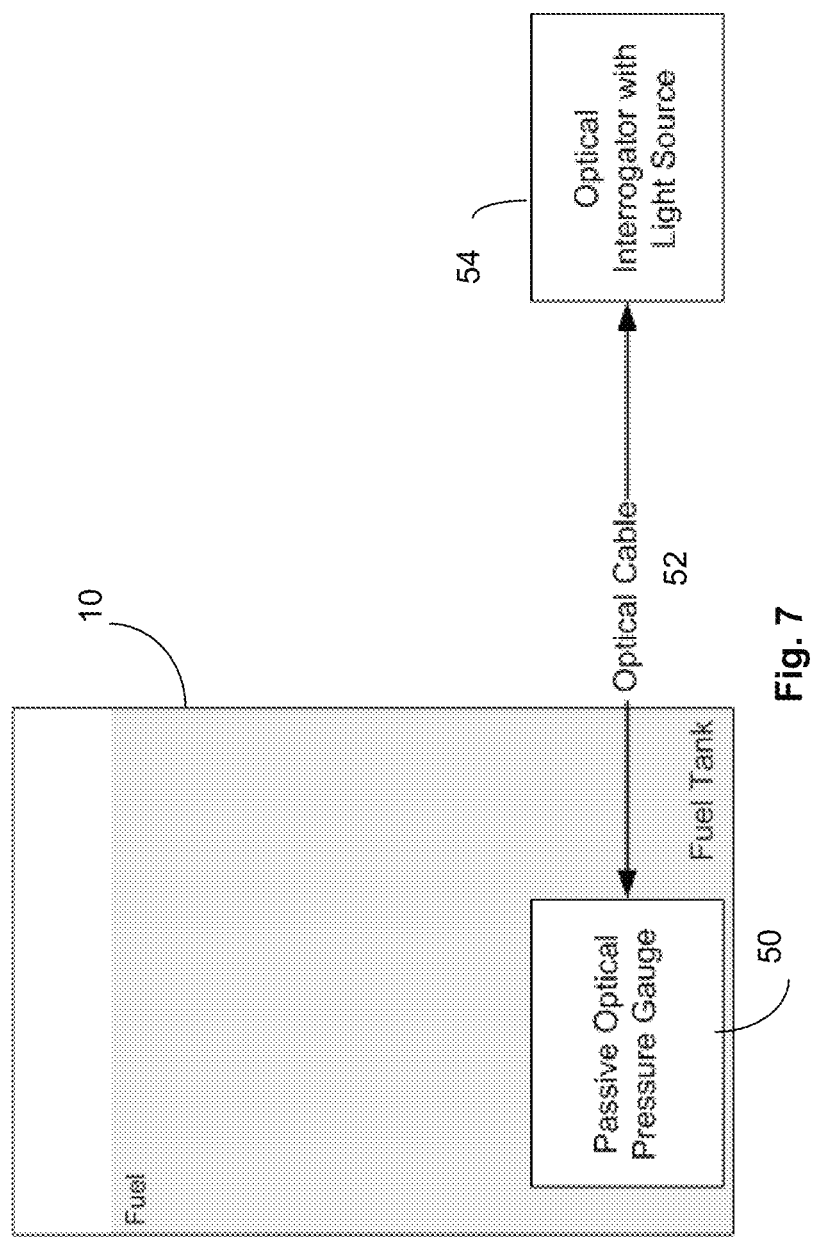
FIG. 7 is a schematic diagram illustrating use of a passive optical pressure sensor in accordance with an embodiment of the invention.

In the configuration shown in FIG. 7, a passive optical pressure sensor 50 is arranged within the fuel tank 10. An optical cable 52 couples the passive optical pressure sensor 50 to an optical interrogator 54 (e.g., a controller). The optical interrogator 54 provides both power and control signals to the passive pressure sensor 50 via the optical cable 52, and receives data from the passive pressure sensor 50 via the optical cable 52. The optical interrogator 54 then may condition the received data to provide a pressure reading.

The passive optical pressure sensor changes some property of the light it is interrogated with. Typically, these types of sensors operate at very low levels of optical power (<1 mW) and do not pose any danger due to the small amount of optical energy entering the fuel tank.

There are two major types of practical, passive, optical pressure sensors which use the peak optical wavelength of a resonant structure as a function dependent upon pressure. Measuring optical wavelength as opposed to optical amplitude is a much more reliable sensor approach, which eliminates non-pressure effects, such as fiber attenuation.

Figure 8:
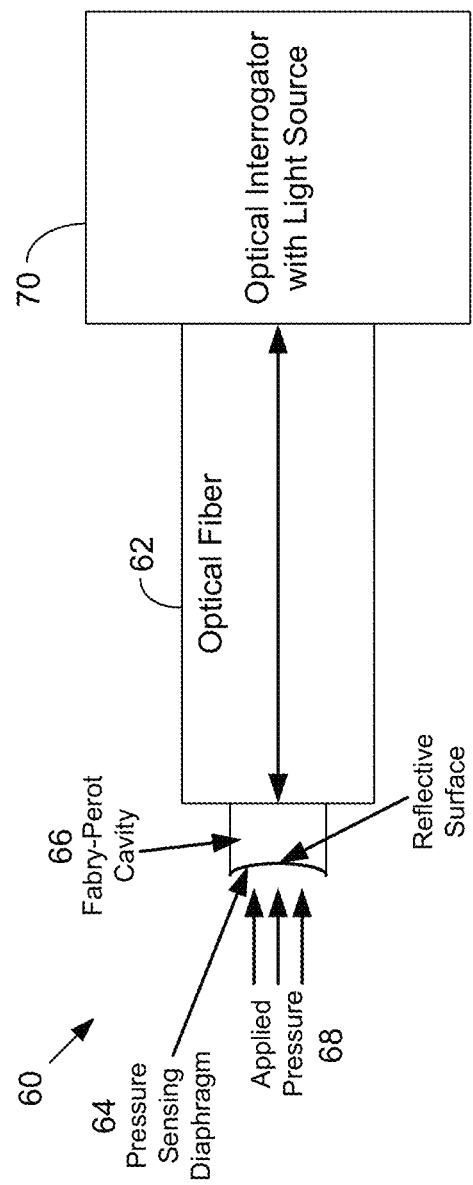
FIG. 8 is a schematic diagram illustrating use of a Fabry-Perot passive optical pressure sensor in accordance with an embodiment of the present invention.

The first passive optical pressure sensor for use in an aircraft fuel tank is based upon the Fabry-Perot Interferometer 60, shown in FIG. 8. Instead of a classic Fabry-Perot cell, using free-space optical coupling, these optical pressure sensors are fabricated either at the end of an optical fiber 62 or in a small substrate coupled to an optical fiber. In either case, one mirrored end of the Fabry-Perot cavity 66 is a mirrored diaphragm 64, coupled to the pressure under measurement 68. The level of pressure causes a deformation of the Fabry-Perot cavity 66, resulting in a change of peak wavelength proportional to the pressure change. If the Fabry-Perot cavity 66 is evacuated, the sensor reads absolute pressure. An optical interrogator 70 (e.g., a controller) monitors the change in peak wavelength and converts the measurement into a pressure signal.

Figure 9:
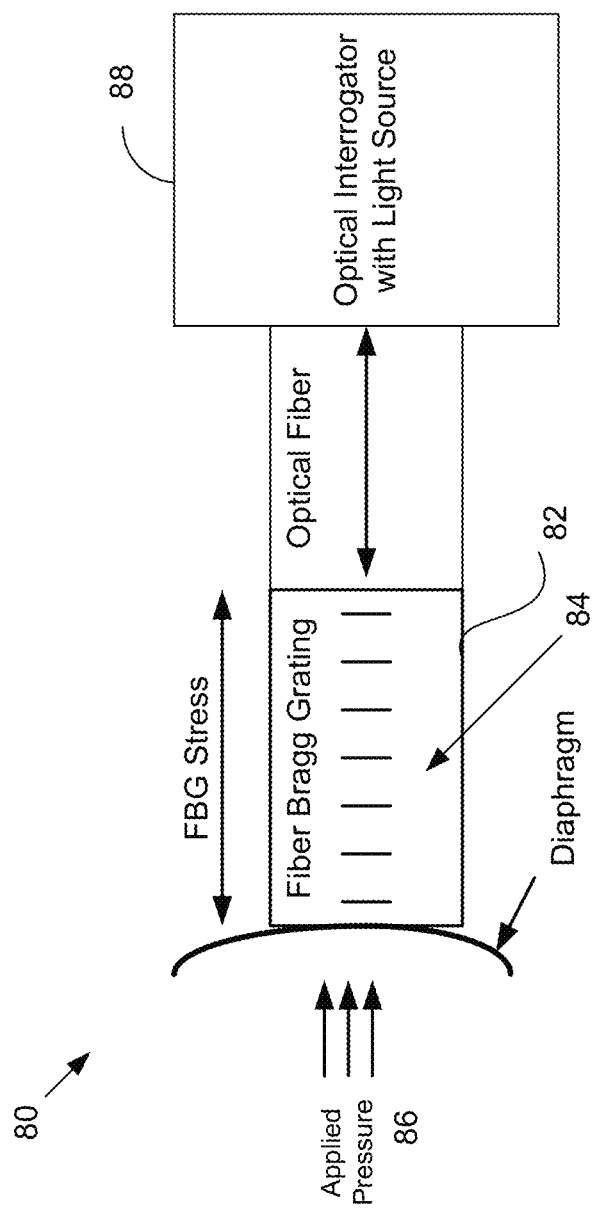
FIG. 9 is a schematic diagram illustrating use of a fiber Bragg grating passive optical pressure sensor in accordance with an embodiment of the present invention.

The second passive optical pressure sensor for use in an aircraft fuel tank is based upon the Bragg Grating, as shown in FIG. 9. The Bragg Grating sensor 80 is typically (but not exclusively) fabricated within an optical fiber, such as a Fiber Bragg Grating (FBG) 82. The FBG 82 includes a linear array of grating lines 84 (e.g., the overall array typically is 1-10 mm in length) spaced at intervals of ½ the nominal optical wavelength. These lines are narrow bands of changed index of refraction (from the nominal silica fiber index of refraction), produced in a specially doped fiber via an interference pattern generated by an ultraviolet laser. Even though each individual line has a fairly small reflection coefficient, the entire array appears as if it is a single resonator with a high reflection coefficient and very high Q (e.g., a very narrow resonance band).

As with the Fabry-Perot sensors, an external stress 86 on the FBG 82 (in the axial direction) changes the spacing between the grating lines 84 and causes a shift of peak wavelength. The external stress can be due to temperature change or mechanical force. If the FBG 82 is appropriately coupled to a mechanism, such as a diaphragm 86 in fluid communication with the fuel, as the fuel pressure changes the force applied by the fuel to the diaphragm 86 (and thus the FBG 82) changes, causing a change in spacing between the grating lines 84. The change in spacing can be detected via an optical interrogator 88 (e.g., a controller) optically coupled to the FBG 82, which in turn generates a signal corresponding to the applied pressure at the diaphragm 86.

Another application of Bragg Gratings 82 is to generate the gratings within an optical substrate (as with the use of femtosecond laser ablation techniques). In this case, the mechanical structure (diaphragm, etc.) has a built-in Bragg Grating and requires an external optical fiber to couple the measurement light to an interrogator 88. This approach eliminates the variability of bonding a conventional FBG to an external diaphragm or other mechanical structure.

Figure 11:
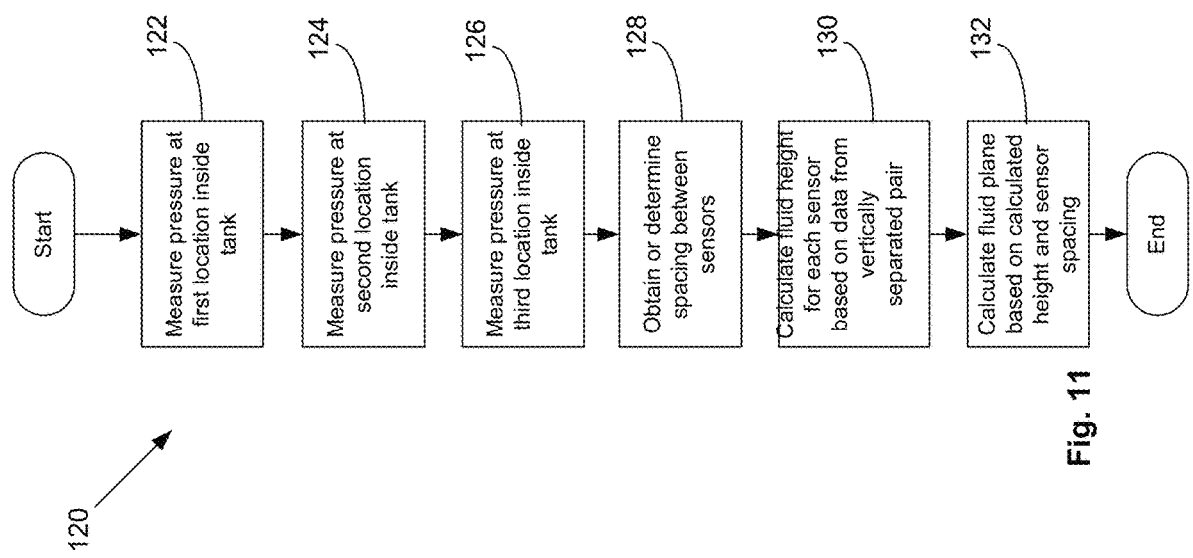
FIG. 11 is a flow chart illustrating an exemplary method of calculating a location of a fluid plane within the fluid tank in accordance with the present invention.
Figure 10:
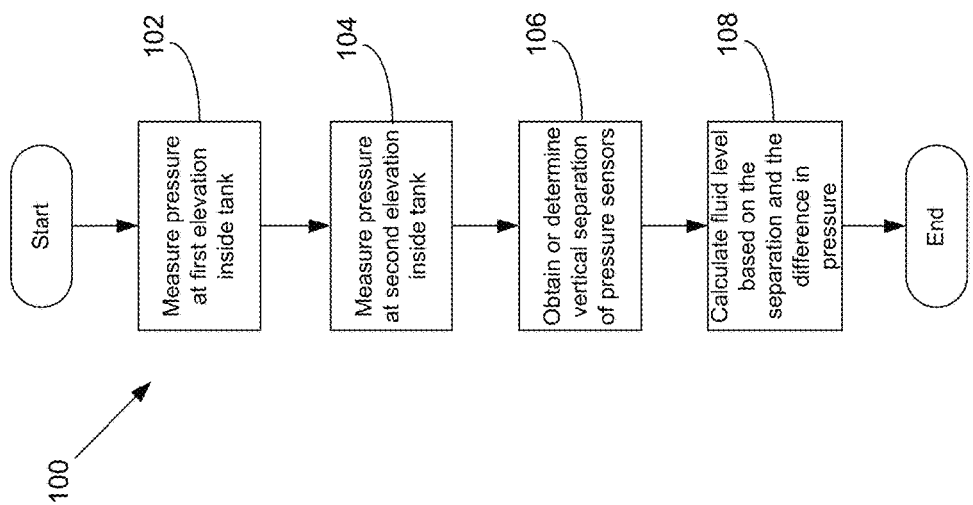
FIG. 10 is a flow chart illustrating an exemplary method for calculating fluid level within a fluid tank in accordance with the present invention.

Referring now to FIGS. 10 and 11, flow diagrams 100 and 120 illustrating exemplary methods for implementing fluid level measurement in accordance with the present invention is provided. The flow diagrams include a number of process blocks arranged in a particular order. As should be appreciated, many alternatives and equivalents to the illustrated steps may exist and such alternatives and equivalents are intended to fall within the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

FIG. 10 illustrates an exemplary method 100 for determining a fluid level within a fluid tank 10. Beginning at step 102, a pressure measurement is made using a first pressure sensor P1 arranged within the fluid tank 10, and at block 104 a second pressure measurement is made using a second pressure sensor P2 arranged within the fluid tank 10. As described herein, the first pressure sensor P1 and the second pressure sensor P2 are vertically spaced apart from one another by a distance Z. Further, the pressure sensors P1 and P2 preferably are differential pressure sensors.

Next at step 106 the vertical spacing ΔZ between sensors is retrieved. Such spacing, for example, may be determined during system calibration and stored within memory of the controller 11. The controller 11 then can simply access the memory locations in which the data is stored, and retrieve the data therefrom. Alternatively, the spacing may be determined based on detection of the relative positions between the sensors P1 and P2 using a position sensing methodology. Such position sensing methodologies are well known by the person having ordinary skill in the art and therefore are not described herein.

Next at block 108 the fluid level within the fluid tank 10 is calculated based on the pressure difference between the first and second measured pressures. For example, Equation 7 or 8 can be used to determine the fluid level in the tank 10, where $P_2$ is the measured pressure of the lower sensor, $P_1$ is the measured pressure of the upper sensor, ΔZ is the vertical spacing between sensors, and Pn is the measured pressure of the sensor for which the height measurement is being made. Since the measurement is based on the pressure difference between sensors at known locations, the tilt of the tank is taken into account.

Moving now to FIG. 11, an exemplary method 120 for determining a fluid plane within the fluid tank is provided. At steps 122, 124 and 126, pressure measurements are made using three different pressure sensors each horizontally spaced apart from one by a fixed distance (i.e. the sensors are horizontally spaced apart to provide pressure measurements for three non-overlapping locations in the tank). Next at step 128, the spacing between sensors is obtained. As described with respect to the method in FIG. 10, the spacing can be determined during a calibration step and stored in memory of the controller 11. The controller 11 then simply retrieves the spacing during execution of the method steps. Alternatively, the spacing can be determined using conventional position sensing techniques. At block 130 the height of the fluid above each sensor is calculated based on data obtained from the vertically separated pair of sensors (see Equations 7 and/or 8 as described herein). The plane of the fluid level then can be determined based on the height measurements from each of the three sensors as shown in Equation 9.

The system, apparatus and method in accordance with the present invention can be used to measure fluid level in a fluid tank, such as a fuel tank of an aircraft, submarine, train, tank, automobile, truck, etc. Moreover, by measuring the difference in pressure between two pressure sensors, the inclination of the fluid tank as well as the pitch and roll of the tank can be determined without actually measuring the inclination, pitch and/or roll. This can be advantageous for measuring fluid level in vehicles that experience pitch and roll, such as an aircraft.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A fluid level measurement system, comprising:
a first pressure sensor disposed inside a fluid tank at a first elevation relative to a fixed tank vertical axis;
a second pressure sensor disposed inside the fluid tank at a second elevation relative to the fixed tank vertical axis, the second elevation different from the first elevation,
wherein the first pressure sensor and the second pressure sensor are configured to provide a signal indicative of a sensed pressure, and fluid height in the fixed tank vertical axis is calculated from
i) a scale factor obtained by dividing a known vertical spacing between the first and second pressure sensors in the fixed tank vertical axis by a difference in the pressure sensed between the second pressure sensor and the first pressure sensor, wherein the pressure sensed by the first and second pressure sensors is obtained while both the first and the second pressure sensors are immersed in the fluid, and ii) a sensed pressure from one of the first or second pressure sensors.

2. The fluid level measurement system according to claim 1, further comprising a controller communicatively coupled to the first pressure sensor and the second pressure sensor to receive the signal indicative of the sensed pressure from each sensor, the controller configured to calculate the fluid level in the fluid tank based on the scale factor and the sensed pressure from one of first or second pressure sensors.

3. The fluid level measurement system according to claim 1, further comprising the fluid tank.

4. The fluid level measurement system according to claim 1, wherein the first pressure sensor is spaced a first known distance apart from the second pressure sensor along an axis parallel to the fixed tank vertical axis.

5. The fluid level measurement system according to claim 4, further comprising a third pressure sensor disposed inside the fluid tank and at a third elevation relative to the fixed tank vertical axis of the fluid tank, the third pressure sensor spaced a second known distance apart from the first pressure sensor and a third known distance from the second pressure sensor,
wherein the controller is configured to calculate a location of a fluid surface plane in the fluid tank based on the sensed pressure of the first, second and third pressure sensors and the first known distance, the second known distance, and the third known distance.

6. The fluid level measurement system according to claim 5, wherein the controller is configured to calculate at least one of a pitch angle of a fluid surface or a roll angle of the fluid surface relative to a reference surface of the fluid tank based on the first known distance, the second known distance, and the third known distance.

7. The fluid level measurement system according to claim 1, wherein the first pressure sensor and the second pressure sensor are arranged on a common support member of an integrated pressure assembly.

8. The fluid level measurement system according to claim 1, wherein at least one of the first pressure sensor or the second pressure sensor comprises an optical pressure sensor.

9. The fluid level measurement system of claim 8, wherein the controller is optically coupled to at least one of the first pressure sensor or the second pressure sensor.

10. The fluid level measurement system according to claim 1, wherein at least one of the first pressure sensor or the second pressure sensor comprises a passive optical pressure sensor.

11. The fluid level measurement system according to claim 1, wherein at least one of the first pressure sensor or the second pressure sensor comprises at least one of a passive Fabry-Perot optical pressure sensor or a passive Fiber Bragg Grating optical pressure sensor.

12. The fluid level measurement system according to claim 1, wherein at least one of the first pressure sensor or the second pressure sensor comprises a differential pressure sensor having a first port fluidically connected to an ullage portion of the fluid tank.

13. The fluid level measurement system of claim 12, further comprising a gas-filled equalizer arranged within the fluid tank and fluidically connected to an ullage portion of the fluid tank, wherein the first port of each differential pressure sensor is fluidically connected to the gas-filled equalizer.

14. The fluid level measurement system of claim 13, wherein the gas-filled equalizer comprises an outer surface and a portion of the outer surface includes a flexible membrane, further comprising a fourth pressure sensor disposed inside the tank, wherein the fourth pressure sensor is a differential pressure sensor having a first port fluidically connected to the ullage portion of the fluid tank and a second port fluidically connected to the gas-filled equalizer.

15. An aircraft, comprising:
a fuel tank; and
the fluid level measurement system according to claim 1 arranged within the fuel tank.

16. A method of measuring a fluid level in a fluid tank, the fluid tank including a first pressure sensor disposed inside the fluid tank at a first elevation relative to a fixed tank vertical axis of the fluid tank and a second pressure sensor disposed inside the fluid tank at a second elevation relative to the fixed tank vertical axis of the fluid tank, the second elevation different from the first elevation, the method comprising:
using the first pressure sensor to measure a first pressure value;
using the second pressure sensor to measure a second pressure value; and
calculating the fluid level of the fluid in the tank based on
i) a scale factor obtained by dividing a known vertical spacing between the first and second pressure sensors in the fixed tank vertical axis by a difference in the pressure sensed between the second pressure sensor and the first pressure sensor while both the first and the second pressure sensors are immersed in the fluid, and
ii) a sensed pressure from one of the first or second pressure sensors.

17. The method according to claim 16, wherein using the first and second pressure sensors includes using first and second differential pressure sensors, respectively, to measure the first and second pressure values.

18. The method according to claim 17, further comprising coupling the first and second pressure sensors to a pressure equalizer, the pressure equalizer fluidically coupled to an ullage of the fluid tank.

19. A method of measuring a fluid level in a fluid tank, the fluid tank including a first pressure sensor disposed inside the fluid tank at a first elevation relative to a height axis of the fluid tank and a second pressure sensor disposed inside the fluid tank at a second elevation relative to the height axis of the fluid tank, the second elevation different from the first elevation, the method comprising:
using the first pressure sensor to measure a first pressure value;
using the second pressure sensor to measure a second pressure value; and
calculating the fluid level of the fluid in the tank based on a difference in pressure between the first measured pressure value and the second measured pressure value, wherein calculating the fluid level includes using the equation $$Z_n = \frac{\Delta Z}{P_2 - P_1} \times P_n,$$

where $Z_n$ is the fluid level, $P_2$ is the second measured pressure value, $P_1$ is the first measured pressure value, $\Delta Z$ is the difference between second elevation and the first elevation, and $P_n$ is the pressure reading of an nth pressure sensor.

* * * * *